Jan. 12, 1971  R. C. LA FORCE  3,554,034
GRAVIMETER
Filed Aug. 27, 1968

INVENTOR
RICHARD C. LAFORCE

BY  McLean, Morton & Boustead
ATTORNEYS

United States Patent Office 3,554,034
Patented Jan. 12, 1971

3,554,034
GRAVIMETER
Richard C. La Force, Grosse Point, Mich., assignor to
Sinclair Oil Corporation, a corporation of New York
Filed Aug. 27, 1968, Ser. No. 755,635
Int. Cl. G01v 7/04
U.S. Cl. 73—382                                     4 Claims

ABSTRACT OF THE DISCLOSURE

A superconductive sphere is levitated by a current-carrying coil. Displacement of the sphere from its equilibrium position, caused by changes in gravitational force, are optically detected, and in response to the detector output a current is generated in another coiled wire encircling the sphere. The magnetic field caused by this current generates a force which returns the sphere to its equilibrium position. Measurement of the restoring current permits determination of the change in gravitational force.

---

This invention relates to gravimeters. More particularly, this invention relates to gravimeters suitable for use in geophysical prospecting.

All of the standard geophysical techniques involve surface measurements of significant physical properties of subsurface rocks. Systemic variations in these properties often give evidence of structures or accumulations having economic value. Such variations are referred to as anomalies, and these variations, rather than the absolute values of the physical properties, are most interesting to the geophysicist. Most geophysical interpretation is carried on with the object of determining subsurface geology by analysis of anomalies.

Among the methods used by geophysicists to detect anomalies is measurement of gravitational attraction. Variations are measured in the gravitational pull of rocks which lie as much as several miles below the earth's surface. Any subsurface structures, e.g., salt domes or buried ridges, causing lateral irregularities in density distribution give rise to corresponding variations along the surface in the force of gravity.

The term gravimeter or gravity meter is commonly used to denote an instrument in which the acceleration of gravity is determined by measuring the force necessary to support a suspended mass. Hence, gravimeters are the instruments commonly used in geophysical prospecting to measure small variations in the vertical component of gravity directly. Thus, elements in gravimeters move as changes in the strength of gravity are detected. However, these movements tend to be slight. Given, for instance, that the gravitational acceleration at the earth's surface is about 980 cm./sec.$^2$ or, as geophysicists denominate it in honor of Galileo, about 980 gals., and given that anomalies caused by subsurface structures such as salt domes and buried ridges and having economic or scientific importance seldom have peak values of more than 1 or 2 milligals., the movement of the suspended mass in a gravimeter in response to a gravitational field variation is clearly quite small. Consequently, it is of importance to provide such instruments of great sensitivity.

In one type of prior art gravimeter a known mass is suspended, for example, from a spring having known properties. Changes in gravitational attraction result in displacement of the mass from equilibrium. Measurement of the displacement from equilibrium then permits determination of the change in gravitational attraction. Since such displacements are extremely small, they usually must be magnified by optical, mechanical or electrical means in order to obtain a measurable output. Any error in the sensing of the displacement is accordingly magnified.

In another type of gravimeter, a mass is mechanically suspended, for example from a spring, and the displacement of the mass due to a change in gravitational attraction results in generation of a counteracting force which returns the mass to its original position. The magnitude of the counteracting force required to return the mass to its original position is proportional to the change in gravitational attraction. Thus, measurement of the counteracting force permits determination of the change in gravity. An exemplary gravimeter of this type is disclosed and claimed in U.S. Pat. No. 3,066,255 issued Nov. 27, 1962 to J. A. Westphal.

Both of the above methods of determination of a change in gravitational attraction are subject to error due to weakening or fatigue in mechanical apparatus. Thus, for example, if the mass is suspended from a spring which changes its extension as the gravitational attraction changes, the accuracy of the system lessens as the spring fatigues.

The present invention is a gravimeter comprising an electrically superconducting sphere levitated by the magnetic field caused by current in a coil of wire encircling the sphere. Changes in gravitational attraction cause displacement of the sphere relative to coil. This displacement is detected and used to generate a current in an auxiliary coil of wire which restores the sphere to its original position. Measurement of the restoring current in this auxiliary coil then permits determination of the gravitational change. For optimum performance the sphere and the first coil of wire are supercooled to a temperature near that of liquid helium (in the order of 4.2° K.). Consequently, the first coil of wire is also superconducting, and so it has a substantially constant current in it, and no elaborate, regulated power supply is required. To insure against errors due to deviations in the earth's magnetic field, the sphere and the two coils of wire are enclosed, for example, in a superconducting shield.

These and other features and advantages of the present invention will be apparent from the following detailed description and claims, particularly when read in conjunction with the accompanying drawings in which like parts bear like reference designations.

Figure 1:
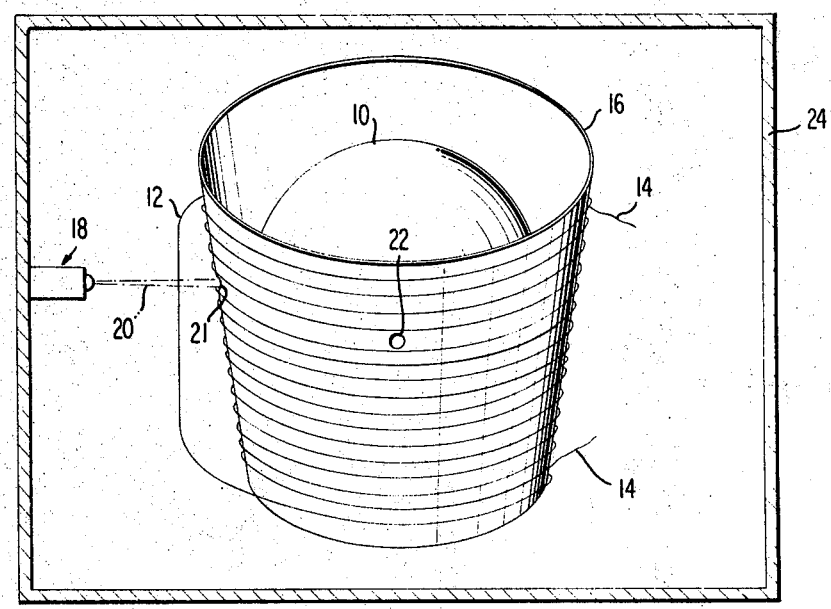
FIG. 1 is a perspective view, partly in section, of the displacement member utilized in a preferred embodiment of the present invention.

In FIG. 1 a sphere 10, which is made of a superconducting material and which has a highly polished exterior surface, is encircled by a multiturn continuous coil 12, of superconducting material, and by a multiturn coil 14. Coils 12 and 14 are electrically independent, but they overlap.

Preferably, coils 12 and 14 have a slightly frustoconical configuration, as depicted in FIG. 1, with a lesser diameter at their lower end than at their upper end. This improves vertical sensitivity of the apparatus, reduces lateral movement of sphere 10 within the coils, and in general improves the operation of the apparatus, as well as supporting sphere 10 prior to start-up of the system. If desired, sphere 10 can be housed within a container 16 made of nonshielding material, with coils 12 and 14 wound around container 16, as depicted in FIG. 1.

Light source 18 is located outside coils 12 and 14 and includes a lamp and lens system that projects a beam of light 20 onto sphere 10. This beam of light 20 passes through opening 21 in container 16 to reach sphere 10 which reflects the light, and the reflected light beam leaves container 16 via opening 22.

Sphere 10 and coils 12 and 14 are enclosed within shield 24 which prevents the earth's ambient magnetic field and other extraneous magnetic fields from affecting the highly sensitive operation of the apparatus. Shield 24 has a suitable lensed opening (not shown) to permit passage through it of the reflected light beam passing from sphere 10 through opening 22. In addition, shield 24 has suitable terminations (not shown) to permit connection of coil 14 to the apparatus of FIG. 2.

The interior of shield 24 is maintained at a temperature at which sphere 10 and coil 12 exhibit superconductive properties. Thus, sphere 10 and coil 12 are made of a superconductive material, such as lead, tantalum or niobium, and they are maintained at a temperature close to zero degrees Kelvin. By way of example, they might be cooled by a bath of liquid helium, having a temperature in the order of 4.2° K. At such a temperature these superconductive materials exhibit substantially no resistance to passage of electrical current. Should the ambient temperature rise above this critical temperature or should either the magnetic field intensity or the electrical current flow rise above critical levels, these superconductive materials "switch" their state to exhibit normal resistances. Thus, for example, if coil 12 is a closed loop, as in FIG. 1, and is in its superconductive state with a current flowing in it, that current continues to flow substantially indefinitely so long as the superconductive state is maintained.

Current can be caused to flow in coil 12 by any of several methods. By way of example, a magnet can be passed through the central opening of coil 12 inducing a current in the coil. Alternatively, as described in U.S. Pat. No. 3,026,151 issued Mar. 20, 1962 to Theodor A. Buchhold, coil 12 can be connected to a source of electrical energy for a brief period of time after which it is disconnected. Since coil 12 has substantially no resistance in its superconducting condition, the current caused to flow in it while connected to the electrical energy source continues to flow after disconnection.

Since sphere 10 is made of a superconducting material, the current in coil 12 induces current flow on the surface of sphere 10. The current flowing in coil 12 generates a magnetic field. The force generated by this magnetic field acting upon superconductive sphere 10 is sufficient to levitate sphere 10. As a consequence, sphere 10 is suspended in an equilibrium position within coils 12 and 14. The height of the equilibrium position depends upon the gravitational force and upon the current in coils 12. Any current flowing in coil 14, of course, affects this equilibrium position.

Figure 2:
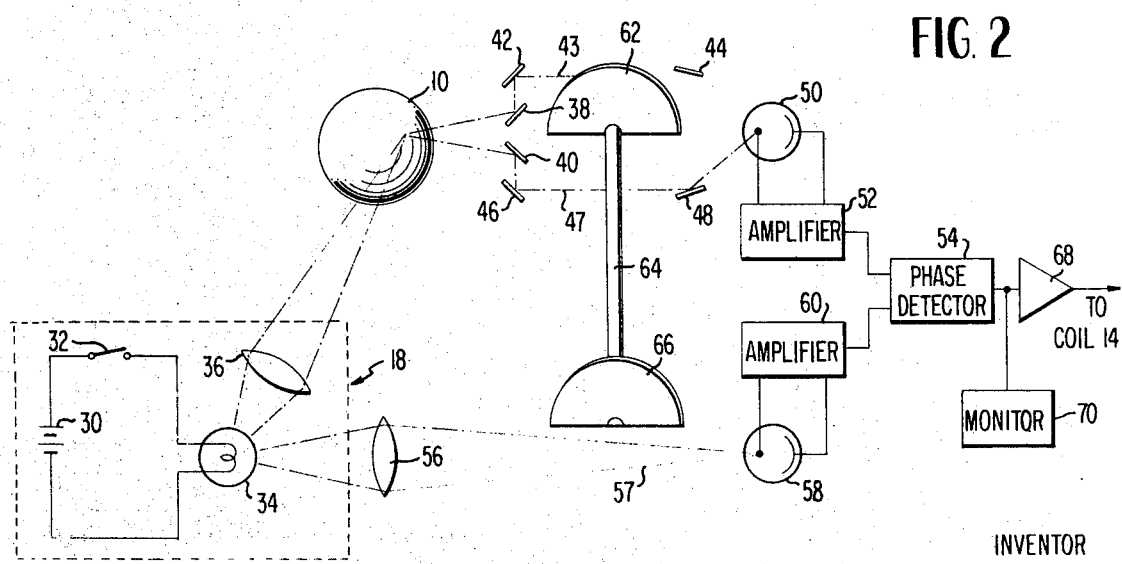
FIG. 2 is a schematic representation of the gravimeter of the present invention.

FIG. 2 depicts schematically the gravimeter of the present invention. For clarity, superconductive sphere 10 is shown without coils 12 and 14 and without container 16 and shield 24, but these components are in place during operation of the system.

Light source 18 is depicted schematically in FIG. 2 as comprising voltage source 30, switch 32 and lamp 34, connected in series, and lens 36 which focuses light from lamp 34 onto sphere 10. Voltage source 30 and switch 32 might, of course, be located outside of shield 24 and coupled through shield 24 to lamp 34.

The light from lamp 34 is focused by lens 36 onto sphere 10 which reflects it onto mirrors 38 and 40. The light beam reflected by mirror 38 passes to mirror 42 which directs it into a path toward mirror 44. Likewise, the light beam from mirror 40 is reflected by mirror 46 into a path toward mirror 48. Mirrors 44 and 48 are positioned so that the light beams 43 and 47 impinging upon them from mirrors 42 and 46, respectively, are directed to phototube 50. Phototube 50 is connected to amplifier 52 which applies the amplified phototube output to one input of phase detector 54.

Lens 56 directs light into a path toward phototube 58. This light might originate from lamp 34, as depicted in FIG. 2, or it might originate from a separate lamp. Phototube 58 is connected to amplifier 60 which applies the amplified phototube output to the other input of phase detector 54.

Shutter 62 is mounted upon shaft 64 so that as shaft 64 is rotated by a motor or other means (not shown), shutter 62 rotates to alternately interrupt first the light beam 43 between mirror 42 and mirror 44 and then light beam 47 between mirror 46 and mirror 48. Thus, phototube 50 is exposed first to light beam 43 and then to light beam 47. Shutter 66 is also mounted on shaft 64 to rotate with shutter 62. As shutter 66 rotates, it intermittently interrupts the light beam 57 impinging upon phototube 58.

When sphere 10 is in its equilibrium position, light reflects from it equally onto mirror 38 and onto mirror 40. Consequently, the two light beams 43 and 47 which alternately reach photocell 50 are of equal intensity, and the amplified photocell output, which is applied by amplifier 52 to detector 54, is substantially constant. If a change in gravitational force results in a vertical displacement of sphere 10, the two light beams 43 and 47 are no longer of equal intensity. Thus, for example, if sphere 10 rises slightly, more light is reflected from sphere 10 to mirror 40 than from sphere 10 to mirror 38. Consequently, the light intensity reaching phototube 50 is greater during the time light beam 47 passes from mirror 46 to mirror 48 to phototube 50 than during the time light beam 43 passes from mirror 42 to mirror 44 to phototube 50. As a result the output of amplifier 52 includes an alternating component. Likewise, if sphere 10 drops below its equilibrium position, the output of amplifier 52 includes an alternating component, but the phase of this signal differs by 180° from the phase of the amplifier output when sphere 10 rises.

The output of amplifier 60 is an alternating signal since the light beam reaching phototube 58 is intermittently interrupted by shutter 66. Since shutter 66 rotates at the same rate as shutter 62, the alternating output from amplifier 60 has the same frequency as any alternating component in the output of amplifier 52.

Detector 54 phase detects the output of amplifier 52, using the output of amplifier 60 as a reference. The magnitude of the output of detector 54 is dependent on the comparative intensities of the two light beams 43 and 47 reaching phototube 50, and the polarity of the output indicates which light path is of greater intensity. This detector output is amplified by amplifier 68 and is applied to coil 14. Thus, if a change in gravitational force causes sphere 10 to move from its equilibrium position, the resulting output of detector 54 causes a current in coil 14 which generates a magnetic field. This magnetic field acts upon the superconducting sphere 10 to generate a force returning sphere 10 to its equilibrium position.

The output of detector 54 is also applied to monitor 70 which may be an indicating instrument or a recording instrument or both. Monitor 70 provides an indication of the current required to maintain sphere 10 in its equilibrium position. Since this current is related to the change in gravitational force, monitor 70 can be calibrated to read directly in units of gravitational force.

If desired, current from an adjustable source (not shown) can be summed within coil 14 with any current from amplifier 68 to permit initial calibration of the system so that sphere 10 will have the desired equilibrium position.

While the above description of a preferred embodiment of the present invention has disclosed the use of particular components, numerous modifications and changes can be made and still be within the scope of the invention. Thus, for example, while a single phototube 50 has been disclosed for converting both light beams 43 and 47 into electrical signals, obviously separate identical phototubes could be used for each light beam, with the two phototubes alternately connected to amplifier 52. It is accordingly intended that the scope of the invention should be limited only by the claims.

What is claimed is:

1. A gravimeter comprising a sphere of superconducting material; a multiturn closed coil of superconducting material encircling said sphere and adapted to carry a current to cause a first magnetic field to levitate said sphere to an equilibrium position; means for cooling said sphere and said multiturn coil to maintain said sphere and said multiturn coil in a superconducting condition; an auxiliary coil encircling said sphere; a light source directed onto the surface of said sphere to cause a reflected light having a direction dependent upon the position of said sphere relative to the equilibrium position; means for directing the reflected light into first and second light beams having relative intensities indicative of the reflected light direction; phototube means positioned to intercept the first and second light beams; a shutter which alternates between a first position in which it interrupts the first light beam and a second position in which it interrupts the second light beam; means for generating a reference signal which alternates at the same rate as said shutter alternates; a phase detector connected to the output of said phototube means and referenced to the reference signal for generating a control signal having an amplitude and polarity indicative of the relative intensities of the first and second light beams; and means coupling said phase detector to said auxiliary coil and responsive to said control signal for generating control current in said auxiliary coil to return said sphere to said equilibrium position, said last-named means adapted for connection to an indicator for indicating the magnitude and polarity of the control current.

2. A gravimeter as claimed in claim 1 further comprising indicating means for indicating the magnitude and polarity of said control current.

3. A gravimeter as claimed in claim 1 further comprising means for shielding said sphere, said multiturn coil, and said auxiliary coil from extraneous magnetic fields.

4. A gravimeter as claimed in claim 1 in which said means for cooling includes liquid helium.

References Cited

UNITED STATES PATENTS

| 3,090,239 | 5/1963 | Ducas | 73—517 |
| 3,211,003 | 10/1965 | Worden | 73—382 |
| 3,261,210 | 7/1966 | Buchhold | 73—517 |
| 3,272,016 | 9/1966 | Mullins | 73—517 |
| 3,449,956 | 6/1969 | Goodkind et al. | 73—382 |
| 3,424,006 | 1/1969 | Dicke et al. | |

JAMES J. GILL, Primary Examiner

H. GOLDSTEIN, Assistant Examiner